A. PLOCH.
BOLL WEEVIL CATCHER.
APPLICATION FILED OCT. 15, 1920.
1,383,422.
Patented July 5, 1921.
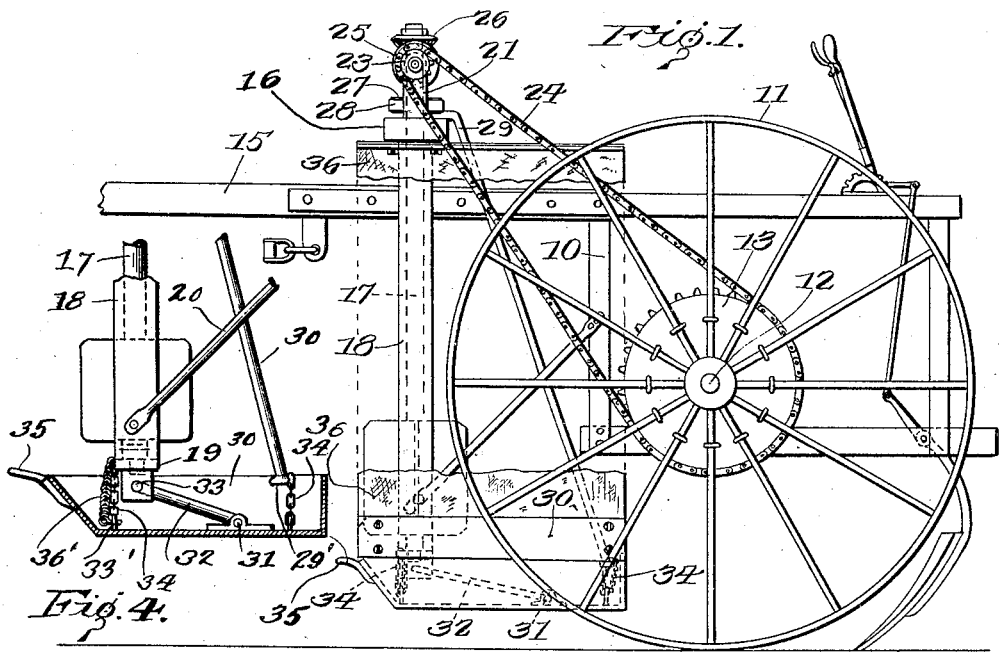

UNITED STATES PATENT OFFICE.

ALEX PLOCH, OF CARPENTER, TEXAS, ASSIGNOR OF SEVEN-EIGHTHS TO THEODZIA PLOCH, OF CARPENTER, TEXAS.

BOLL-WEEVIL CATCHER.

1,383,422.   Specification of Letters Patent.   Patented July 5, 1921.

Application filed October 15, 1920. Serial No. 417,182.

*To all whom it may concern:*

Be it known that I, ALEX PLOCH, a citizen of the United States, residing at Carpenter, in the county of Wilson, State of Texas, have invented certain new and useful Improvements in Boll-Weevil Catchers; and I do hereby declare the following to be a full, clear, and exact description of the invention, such as will enable others skilled in the art to which it appertains to make and use the same.

This invention relates to new and useful improvements in insect catchers and destroyers, and particularly to devices for catching and destroying the boll weevil.

One object of the invention is to provide a construction of a device of this character which is readily applicable to the frame of a cultivator and wherein the beating elements are driven from the ground engaging wheels of the machine.

Another object is to provide a device of this character which has receptacles filled with an insect destroying liquid which are arranged to straddle the rows of plants, and over which are arranged rotary beaters for knocking insects from the plants and into the receptacles.

Other objects and advantages will be apparent from the following description when taken in connection with the accompanying drawing.

In the drawing:

Figure 1 is a side elevation of a cultivator showing the device applied thereto, the fabric sheets being broken away.

Fig. 2 is a front elevation of the same.

Fig. 3 is a top plan view of the device, the vertical shafts being shown in cross section.

Fig. 4 is a vertical longitudinal sectional view through one of the pans, on the line 4—4 of Fig. 3.

Referring particularly to the accompanying drawing, 10 represents the frame of a cultivator having ground engaging wheels 11 on the axle 12 of which is secured a sprocket wheel 13. Secured to the rear portion of the tongue 15, and extending transversely thereof is a base member 16, and disposed vertically through this base member are two shafts 17. Depending legs 18 are secured to the lower face of the member 16 and have their lower ends turned laterally, as at 19 to receive the lower ends of the shafts 17 rotatably therein. Brace arms 20 are secured to these depending legs and extend upwardly and rearwardly where they are connected to the frame of the cultivator.

Mounted on the beam 16 is a bearing block 21 which supports a horizontal transverse shaft 22, one end of said shaft having a sprocket wheel 23 which is driven from the sprocket 13 by means of the chain 24, while on the other end of the shaft 22 is mounted a beveled gear 25 meshing with a similar gear 26 on the upper end of one of the shafts 17. The upper portions of the shafts 17 are provided with belt wheels 27 around which is engaged a drive belt 28. A second pair of depending legs 29 are carried by the beam 16 and have their lower ends turned laterally as at 29' and disposed within the rear portions of the receptacles or pans 30. In the bottom of each of the pans is a loop 31 in which is engaged one arm of a yoke shaped member 32 which has its other arm engaged in an eye 33 carried by the lower face of the laterally turned portion of the depending leg 18. This is clearly seen in Fig. 4. Small loops are disposed in upstanding relation to the bottom of the pan, at the forward and rearward ends thereof, and connecting the said loops with the laterally turned portions of the said legs 18 and 29 are the chains 34, which loosely suspend the pans from said legs. The inner sides of the pans 30 are spaced a sufficient distance apart to permit them to move at opposite sides of the row of plants. To the forward ends of the pans are secured the forwardly extending and laterally diverging fender wires 35 which prevent the edges of the pans from catching on the stems or stalks of the plants.

The pans are adapted to contain some insect destroying liquid such as water and oil, and as the machine is driven down the row of plants the drive sprocket chain 24 will cause the beaters to rotate, knocking the insects from the plants so that they will fall into the pans and be destroyed by the liquid therein.

The entire device is so constructed that it may be readily attached to any of the cultivating machines now in use and operated with effectiveness.

Secured to the outer sides of the pans, and to the ends of the member 16, are the cloth guards 36 which prevent the insects from being thrown beyond the outer sides of the pans, by the beaters.

Connected to the loops 33' and to the feet of the legs 18 are the coil springs 36' which normally urge the pans inwardly toward the plants, so that the inner sides of the pans contact with the plants and thus avoid dropping of the insects between the pans, as the machine proceeds down the rows.

What is claimed is:

An insect catching and destroying attachment for an agricultural machine comprising a beam having depending legs carried thereby, vertical shafts disposed through the beam, a horizontal shaft mounted on the beam and driven by the machine, driving connections between the horizontal and one of the vertical shafts, driving connections between the vertical shafts, certain of said depending legs having bearings to support the lower ends of the vertical shafts, flexible elements carried by the depending legs, and insect receiving pans suspended by said flexible elements below the legs, rotary beaters carried by the vertical shafts, and plant guards carried by the pans.

In testimony whereof, I affix my signature in the presence of two witnesses.

ALEX PLOCH.

Witnesses:
 HARRY BRAUSE,
 HERMAN SCHROEDER.